United States Patent
Shieh (10) Patent No.: US 9,609,083 B2
(45) Date of Patent: *Mar. 28, 2017

(54) DISTRIBUTED SERVICE PROCESSING OF NETWORK GATEWAYS USING VIRTUAL MACHINES

(71) Applicant: vArmour Networks, Inc., Mountain View, CA (US)

(72) Inventor: Choung-Yaw Shieh, Palo Alto, CA (US)

(73) Assignee: vArmour Networks, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/877,836

(22) Filed: Oct. 7, 2015

(65) Prior Publication Data

US 2016/0028851 A1     Jan. 28, 2016

Related U.S. Application Data

(63) Continuation of application No. 13/363,082, filed on Jan. 31, 2012, now Pat. No. 9,191,327.

(Continued)

(51) Int. Cl.
*H04L 29/08* (2006.01)
*H04L 12/803* (2013.01)
(Continued)

(52) U.S. Cl.
CPC .......... *H04L 67/32* (2013.01); *G06F 9/45533* (2013.01); *H04L 47/125* (2013.01);
(Continued)

(58) Field of Classification Search
None
See application file for complete search history.

(56) References Cited

U.S. PATENT DOCUMENTS 6,253,321 B1   6/2001   Nikander et al.
6,578,076 B1   6/2003   Putzolu
(Continued)

FOREIGN PATENT DOCUMENTS

TW   201642616 A   12/2016
TW   201642617 A   12/2016
(Continued)

OTHER PUBLICATIONS

Non-Final Office Action, Jul. 1, 2015, U.S. Appl. No. 14/673,640, filed Mar. 30, 2015.

(Continued)

*Primary Examiner* — Christine Duong
(74) *Attorney, Agent, or Firm* — Carr & Ferrell LLP (57) ABSTRACT

A network gateway device includes an ingress interface, an egress interface, and a load balancing module coupled to the ingress and egress interfaces. The load balancing module configured to receive a packet from the ingress interface, determine a set of a plurality of processes corresponding to a connections session associated with the packet based on a policy. For each of the identified processes, the load balancing module is to identify a service processing module executed by a virtual machine that is capable of handling the identified process, and to send the packet to the identified service processing module to perform the identified process on the packet. The packet is then transmitted to the egress interface of the gateway device to be forwarded to a destination.

15 Claims, 8 Drawing Sheets

Related U.S. Application Data (60) Provisional application No. 61/462,980, filed on Feb. 10, 2011.

(51) Int. Cl.
*H04L 29/06* (2006.01)
*G06F 9/455* (2006.01)
*H04W 28/20* (2009.01)
*H04L 12/813* (2013.01)

(52) U.S. Cl.
CPC ...... *H04L 63/0209* (2013.01); *H04L 65/1033* (2013.01); *H04L 67/10* (2013.01); *H04W 28/20* (2013.01); *H04L 47/20* (2013.01)

(56) References Cited

U.S. PATENT DOCUMENTS

| | | |
|---|---|---|
| 6,765,864 B1 | 7/2004 | Natarajan et al. |
| 6,970,459 B1 | 11/2005 | Meier |
| 7,058,712 B1 | 6/2006 | Vasko et al. |
| 7,062,566 B2 | 6/2006 | Amara et al. |
| 7,373,524 B2 | 5/2008 | Motsinger et al. |
| 7,397,794 B1 | 7/2008 | Lacroute et al. |
| 7,519,062 B1 | 4/2009 | Kloth et al. |
| 7,694,181 B2 | 4/2010 | Noller et al. |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,259,571 B1 | 9/2012 | Raphel et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,490,153 B2 | 7/2013 | Bassett et al. |
| 8,494,000 B1 | 7/2013 | Nadkarni et al. |
| 8,565,118 B2 | 10/2013 | Shukla et al. |
| 8,612,744 B2 | 12/2013 | Shieh |
| 8,661,434 B1 | 2/2014 | Liang et al. |
| 8,688,491 B1 | 4/2014 | Shenoy et al. |
| 8,726,343 B1 | 5/2014 | Borzycki et al. |
| 8,798,055 B1 | 8/2014 | An |
| 8,813,169 B2 | 8/2014 | Shieh et al. |
| 8,813,236 B1 | 8/2014 | Saha et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,141,625 B1 | 9/2015 | Thornewell et al. |
| 9,191,327 B2 | 11/2015 | Shieh |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,521,115 B1 | 12/2016 | Woolward |
| 2002/0031103 A1 | 3/2002 | Wiedeman et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0050696 A1 | 3/2006 | Shah et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | van Rietschote et al. |
| 2007/0168971 A1 | 7/2007 | Royzen et al. |
| 2007/0192863 A1 | 8/2007 | Kapoor et al. |
| 2007/0239987 A1 | 10/2007 | Hoole et al. |
| 2007/0271612 A1* | 11/2007 | Fang ............ G06F 21/554 726/22 |
| 2007/0277222 A1 | 11/2007 | Pouliot |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0095367 A1 | 4/2010 | Narayanaswamy |
| 2010/0192225 A1 | 7/2010 | Ma et al. |
| 2010/0199349 A1 | 8/2010 | Ellis |
| 2010/0228962 A1* | 9/2010 | Simon ............ H04L 63/0428 713/150 |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0333165 A1 | 12/2010 | Basak et al. |
| 2011/0003580 A1 | 1/2011 | Belrose et al. |
| 2011/0069710 A1 | 3/2011 | Naven et al. |
| 2011/0072486 A1 | 3/2011 | Hadar et al. |
| 2011/0113472 A1* | 5/2011 | Fung ............ H04L 63/0227 726/3 |
| 2011/0138384 A1* | 6/2011 | Bozek ............ H04L 41/0806 718/1 |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0311144 A1* | 12/2012 | Akelbein ............ G06F 11/3006 709/224 |
| 2012/0311575 A1 | 12/2012 | Song |
| 2013/0019277 A1 | 1/2013 | Chang et al. |
| 2013/0081142 A1 | 3/2013 | McDougal et al. |
| 2013/0086399 A1 | 4/2013 | Tychon et al. |
| 2013/0097692 A1 | 4/2013 | Cooper et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0291088 A1 | 10/2013 | Shieh et al. |
| 2013/0298184 A1 | 11/2013 | Ermagan et al. |
| 2013/0318617 A1 | 11/2013 | Chaturvedi et al. |
| 2014/0007181 A1 | 1/2014 | Sarin et al. |
| 2014/0022894 A1 | 1/2014 | Oikawa et al. |
| 2014/0137240 A1 | 5/2014 | Smith et al. |
| 2014/0157352 A1 | 6/2014 | Paek et al. |
| 2014/0282027 A1 | 9/2014 | Gao et al. |
| 2014/0282518 A1 | 9/2014 | Banerjee |
| 2014/0283030 A1 | 9/2014 | Moore et al. |

(56) References Cited

U.S. PATENT DOCUMENTS

| | | | |
|---|---|---|---|
| 2014/0344435 | A1 | 11/2014 | Mortimore, Jr. et al. |
| 2015/0124606 | A1 | 5/2015 | Alvarez et al. |
| 2015/0163088 | A1 | 6/2015 | Anschutz |
| 2015/0229641 | A1 | 8/2015 | Sun et al. |
| 2015/0249676 | A1 | 9/2015 | Koyanagi et al. |
| 2015/0269383 | A1 | 9/2015 | Lang et al. |
| 2016/0191545 | A1 | 6/2016 | Nanda et al. |
| 2016/0203331 | A1 | 7/2016 | Khan et al. |
| 2016/0269442 | A1 | 9/2016 | Shieh |
| 2016/0294774 | A1 | 10/2016 | Woolward et al. |
| 2016/0294875 | A1 | 10/2016 | Lian et al. |
| 2016/0323245 | A1 | 11/2016 | Shieh et al. |

FOREIGN PATENT DOCUMENTS

| | | | |
|---|---|---|---|
| TW | 201642618 | A | 12/2016 |
| TW | 201703483 | A | 1/2017 |
| WO | WO02098100 | A1 | 12/2002 |
| WO | WO2016148865 | A1 | 9/2016 |
| WO | WO2016160523 | A1 | 10/2016 |
| WO | WO2016160533 | A1 | 10/2016 |
| WO | WO2016160595 | A1 | 10/2016 |
| WO | WO2016160599 | A1 | 10/2016 |

OTHER PUBLICATIONS

Final Office Action, Dec. 4, 2015, U.S. Appl. No. 14/673,640, filed Mar. 30, 2015.
Non-Final Office Action, Jul. 7, 2015, U.S. Appl. No. 14/673,679, filed Mar. 30, 2015.
Non-Final Office Action, Jul. 16, 2015, U.S. Appl. No. 14/677,827, filed Apr. 2, 2015.
Final Office Action, Dec. 2, 2015, U.S. Appl. No. 14/677,827, filed Apr. 2, 2015.
Non-Final Office Action, Nov. 19, 2014, U.S. Appl. No. 13/363,082, filed Jan. 31, 2012.
Final Office Action, Apr. 30, 2015, U.S. Appl. No. 13/363,082, filed Jan. 31, 2012.
Notice of Allowance, Aug. 12, 2015, U.S. Appl. No. 13/363,082, filed Jan. 31, 2012.
Non-Final Office Action, Jan. 23, 2015, U.S. Appl. No. 13/847,881, filed Mar. 20, 2013.
Final Office Action, May 13, 2015, U.S. Appl. No. 13/847,881, filed Mar. 20, 2013.
Non-Final Office Action, May 1, 2015, U.S. Appl. No. 13/860,404, filed Apr. 10, 2014.
Non-Final Office Action, Aug. 12, 2014, U.S. Appl. No. 13/861,220, filed Apr. 11, 2013.
Final Office Action, Jan. 23, 2015, U.S. Appl. No. 13/861,220, filed Apr. 11, 2013.
Non-Final Office Action, May 18, 2015, U.S. Appl. No. 13/861,220, filed Apr. 11, 2013.
Specification, U.S. Appl. No. 14/673,679, filed Mar. 30, 2015.
Specification, U.S. Appl. No. 14/673,640, filed Mar. 30, 2015.
Specification, U.S. Appl. No. 14/677,827, filed Apr. 2, 2015.
Specification, U.S. Appl. No. 14/657,282, filed Mar. 13, 2015.
Specification, U.S. Appl. No. 14/657,210, filed Mar. 13, 2015.
Non-Final Office Action, Jul. 14, 2016, U.S. Appl. No. 13/860,404, filed Apr. 10, 2013.
Non-Final Office Action, Oct. 13, 2016, U.S. Appl. No. 15/199,605, filed Jun. 30, 2016.
Non-Final Office Action, Jul. 6, 2016, U.S. Appl. No. 15/151,303, filed May 10, 2016.
Non-Final Office Action, Jul. 25, 2016, U.S. Appl. No. 15/090,523, filed Apr. 4, 2016.
Notice of Allowance, Jul. 27, 2016, U.S. Appl. No. 15/080,519, filed Mar. 24, 2016.
Non-Final Office Action, Aug. 2, 2016, U.S. Appl. No. 14/657,210, filed Mar. 13, 2015.
Non-Final Office Action, Sep. 16, 2016, U.S. Appl. No. 15/209,275, filed Jul. 13, 2016.
International Search Report mailed Jun. 20, 2016 in Patent Cooperation Treaty Application No. PCT/US2016/024310 filed Mar. 25, 2016, 9 pages.
International Search Report mailed May 3, 2016 in Patent Cooperation Treaty Application No. PCT/US2016/024116 filed Mar. 24, 2016.
International Search Report mailed May 3, 2016 in Patent Cooperation Treaty Application No. PCT/US2016/024300 filed Mar. 25, 2016.
International Search Report mailed May 3, 2016 in Patent Cooperation Treaty Application No. PCT/US2016/024053 filed Mar. 24, 2016.
International Search Report mailed May 6, 2016 in Patent Cooperation Treaty Application No. PCT/US2016/019643 filed Feb. 25, 2016.
Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection.
Non-Final Office Action, May 18, 2016, U.S. Appl. No. 14/964,318, filed Dec. 9, 2015.
NetBrain Enterprise Edition 6.1 feature handbook, Feb. 25, 2016, 48 pages.
Arendt, et al., "Ocelot: User-Centered Design of a Decision Support Visualization for Network Quarantine", 2015 IEEE, 8 pages.
Patent Cooperation Treaty Application No. PCT/US2016/065451, "International Search Report" and "Written Opinion of the International Searching Authority," Jan. 12, 2017, 20 pages.
Notice of Allowance, Feb. 1, 2017, U.S. Appl. No. 15/090,523, filed Apr. 4, 2016.

\* cited by examiner

DISTRIBUTED SERVICE PROCESSING OF NETWORK GATEWAYS USING VIRTUAL MACHINES

RELATED APPLICATIONS

The present application is a continuation that claims the benefit of U.S. Non-Provisional patent application Ser. No. 13/363,082, filed Jan. 31, 2012, now U.S. Pat. No. 9,191,327, which claims the benefit of U.S. Provisional Patent Application No. 61/462,980, filed Feb. 10, 2011, which are all hereby incorporated by reference in their entirety including all references cited therein.

FIELD OF THE INVENTION

Embodiments of the present invention relate generally to network security. More particularly, embodiments of the invention relate to distributed service processing of network gateways using virtual machines.

BACKGROUND

A network gateway handles all network traffic that comes in and goes out of a network it protects. As the attacks get more sophisticated, there are more and more security and network services running on the network gateway to support the additional security functions. However, these additional services consume memory and central processing unit (CPU) resources of the gateway and limit the network throughput that the network gateway can support. Besides, if a network service must run on a particular operating system, e.g., Microsoft Server 2008, but the underlying operating system of the network gateway is different, then the gateway cannot support this network service. This limitation hinders what services the network gateway can support.

Figure 1:
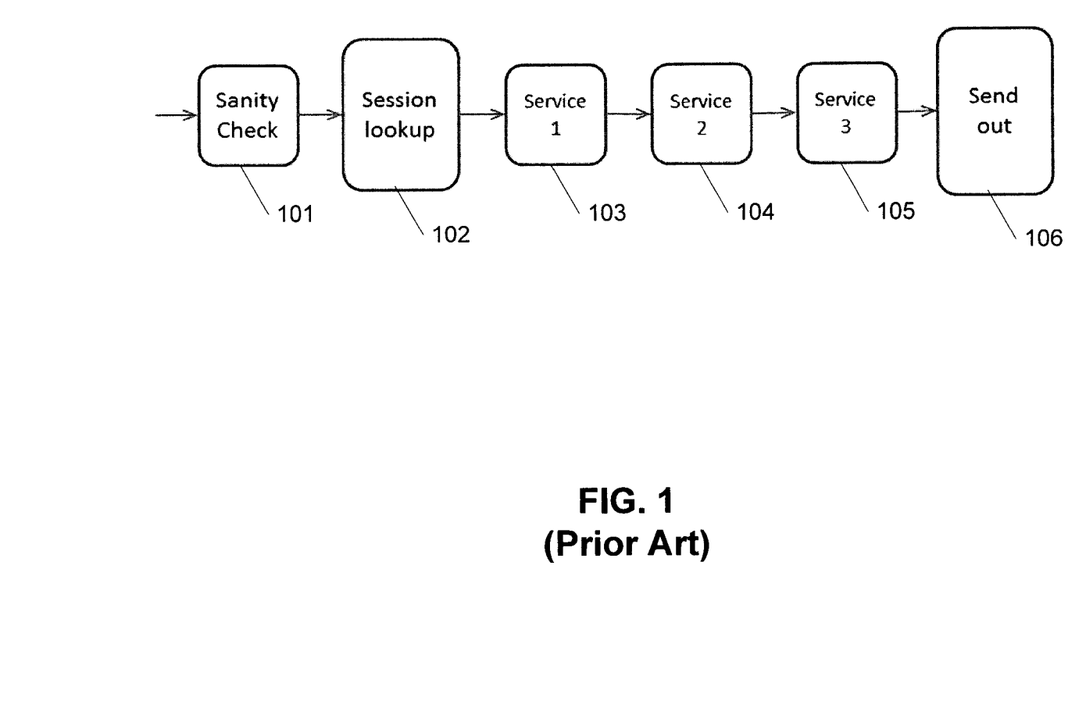
FIG. 1 is a block diagram illustrating traditional service processing in a gateway device.

FIG. 1 is a block diagram illustrating a conventional network processing scheme in a gateway device (also referred to as a network gateway). Referring to FIG. 1, packets go through several network service processing stages in the network gateway, before being forwarded to next hop hosts. Typically, the packets get a sanity check (e.g., checksum, data corruption, etc.) at block 101 and then at block 102, they are processed by a packet classifier to identify the associated connection. The packets then go through multiple network services 103-105 of the identified connection, before they are forwarded out of the network gateway at block 106.

Some of the network services may need to parse the packet payload or search for patterns through the entire payload. These processes take time and memory to operate and consume valuable CPU resources otherwise could be used to process other packets. When there is a large amount of traffic and the packets go through computation-intensive services, the network gateway may slow down and cannot keep up with the traffic.

SUMMARY

A method and apparatus is disclosed herein for distributed service processing using virtual machines. In one embodiment, the method comprises receiving a packet at an ingress interface of a gateway device interfacing a local area network (LAN) and an external network; determining a set of a plurality of processes corresponding a connections session associated with the packet based on a policy; for each of the identified processes, identifying a service processing module executed by a virtual machine that is capable of handling the identified process, and sending the packet to the identified service processing module to perform the identified process on the packet; and transmitting the packet to an egress interface of the gateway device to be forwarded to a destination.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a new design is provided to create distributed service processing in a network gateway to support the increasing system load and to support third party services on different operating systems. An embodiment of the present invention moves at least some of these computation intensive network services into virtual machines. The virtual machines may host one or more of the network services, where the virtual machines may be hosted within the gateway or external to the gateway. Packets are forwarded to the virtual machines then forwarded back to the network gateway after the processing. The network gateway can use a load balancing mechanism to forward the packets to multiple virtual machines. Each virtual machine supports one or more network services of different connections. The load balancing to virtual machines provides a great flexibility and scalability to support a large scale of networks.

Figure 2:
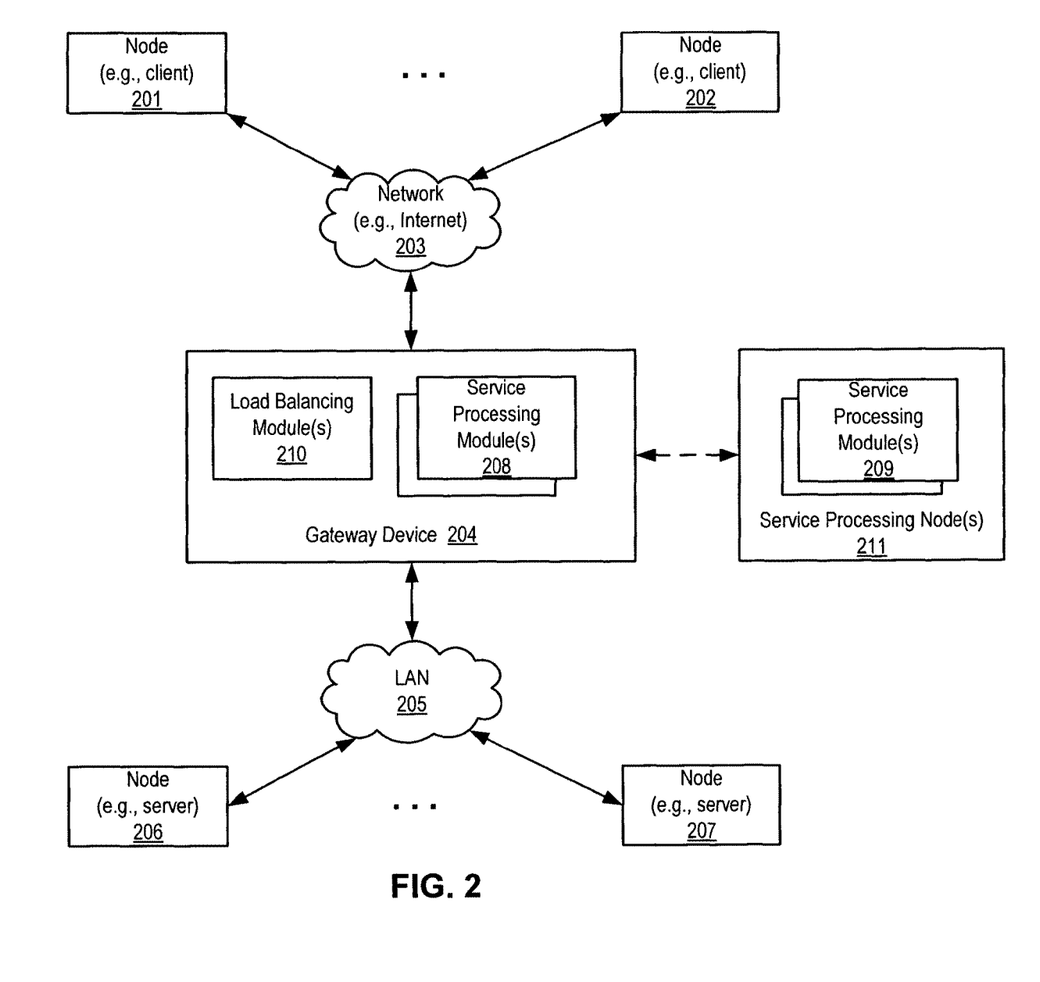
FIG. 2 is a block diagram illustrating an example of a network configuration according to one embodiment of the invention.

FIG. 2 is a block diagram illustrating an example of network configuration according to one embodiment of the invention. Referring to FIG. 2, gateway device 204 (also referred to as a network element, a router, a network access device, or an access point, etc.) provides an interface between network 203 and network 205. Network 203 may be an external network such as a wide area network (WAN) (e.g., Internet) while network 205 represents a local area network (LAN). Nodes 206-207 have to go through gateway device 204 in order to reach nodes 201-202, or vice versa. Any of nodes 201-202 and 206-207 may be a client device (e.g., a desktop, laptop, Smartphone, gaming device, etc.) or a server.

According to one embodiment, gateway device 204 is associated with various service processing modules 208-209, each being executed within a virtual machine (VM). Each service processing module is responsible for handling one or more services. Examples of the services to be performed for gateway device 204 include, but are not limited to, network address translation (NAT), virtual private network (VPN), deep packet inspection (DPI), and/or anti-virus, etc. Some of the service processing modules are located within gateway device 204 (e.g., service processing modules 208) and some are located external to gateway device 204 (e.g., service processing modules 209 maintained by service processing node(s) 211). All of the service processing modules 208-209 are managed by load balancing module 210, which may be located within gateway device 204, in a public cloud associated with network 203, or in a private cloud associated with network 205. In one embodiment, load balancing module 210 and service processing modules 208-209 collectively may represent a distributed firewall of gateway device 204. Further detailed information concerning a distributed firewall can be found in a co-pending U.S. patent application Ser. No. 13/363,088, entitled "Distributed Firewall Architecture using Virtual Machines," filed Jan. 31, 2012, now U.S. Pat. No. 8,612,744, which is incorporated by reference herein in its entirety.

A virtual machine represents a completely isolated operating environment with a dedicated set of resources associated therewith. A virtual machine may be installed or launched as a guest operating system (OS) hosted by a host OS. Typically, a host OS represents a virtual machine monitor (VMM) (also referred to as a hypervisor in one embodiment) for managing the hosted virtual machines. A guest OS may be of the same or different types with respect to the host OS. For example, a guest OS may be a Windows™ operating system and a host OS may be a LINUX operating system. In addition, the guest OSes running on a host can be of the same or different types. A virtual machine can be any type of virtual machine, such as, for example, hardware emulation, full virtualization, para-virtualization, and an operating system-level virtualization virtual machine. Different virtual machines hosted by a server may have the same or different privilege levels for accessing different resources.

Figure 3:
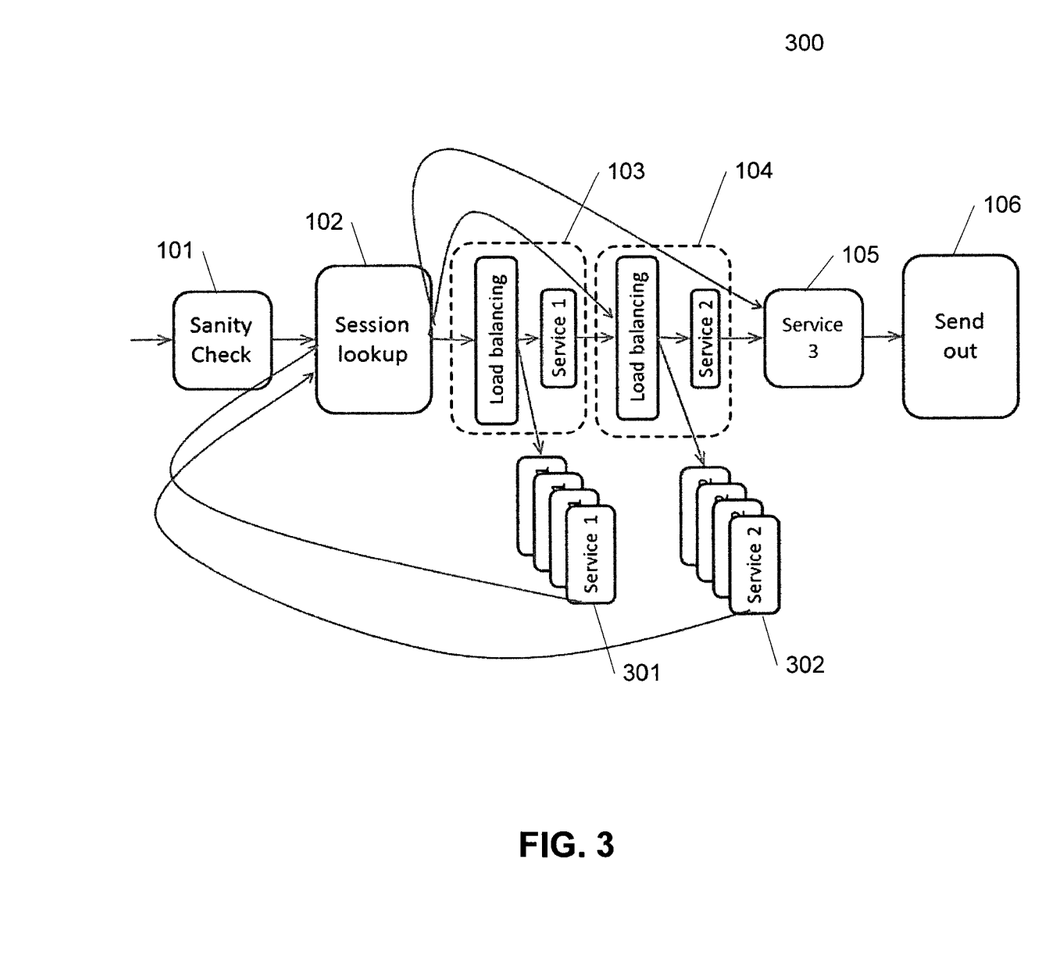
FIG. 3 is a block diagram illustrating an example of distributed service processing according to one embodiment of the invention.

FIG. 3 is a block diagram illustrating an example of a distributed service scheme according to one embodiment of the invention. Processing flow 300 may be performed by gateway device 204 of FIG. 2. Referring to FIG. 3, network service processing is shown distributed to multiple virtual machines. The network services of the gateway device 204 may be moved to external virtual machines such as virtual machines 301-302. When the packets are processed through the network service chaining in a network gateway, if the next network service is at an external virtual machine, the network gateway uses a load balancing mechanism to identify the virtual machine and then forwards the packets to the virtual machine. The load balancing algorithm may be based on round-robin, least connections, or any other well-known load balancing algorithms. The packets are sent back to the network gateway once they are processed by the virtual machine.

In one embodiment, virtual machines 301-302 can be on the same device as the network gateway, or they can reside on different devices which connect to the network gateway through network connections. There are multiple possible communication protocols between the network gateway and virtual machines 301-302 that may be used. If the network gateway and virtual machines 301-302 are in the same layer-2 network, the packet can be forwarded through a layer-2 protocol, such as, for example, the Ethernet protocol. In this case, the original IP packets are encapsulated with an Ethernet header of media access control (MAC) address of both sides. The recipient then de-encapsulates the Ethernet header and retrieves the original IP packets. The communication protocol can also be a layer-3 protocol, such as the IP protocol. The original packets are encapsulated with another IP header with the IP address of both sides. The encapsulation of the outer IP header would ensure the packets are sent and received between the virtual machine and the network gateway.

In another embodiment, the network services can be running on virtual machines or physical hosts. Running on virtual machines provides an additional benefit that additional virtual machines can be added dynamically in case of heavy traffic. Initially the network gateway may have only one virtual machine for a particular network service. When network traffic increases and the virtual machine reaches its capacity, the network gateway can utilize more virtual machines to add more system capacity. New connections are forwarded to different virtual machines for load balancing. This increases system availability and scalability.

The virtual machines 301-302 running the network services can be distributed on different networks, or at different locations, as long as the virtual machines can communicate with the network gateway. One of the examples is to put the virtual machines in a public cloud, and keep the network gateway in a data center. This provides the flexibility to add more computing resources at a lower cost, while maintaining the control of the network gateway in enterprise's premises.

Figure 5:
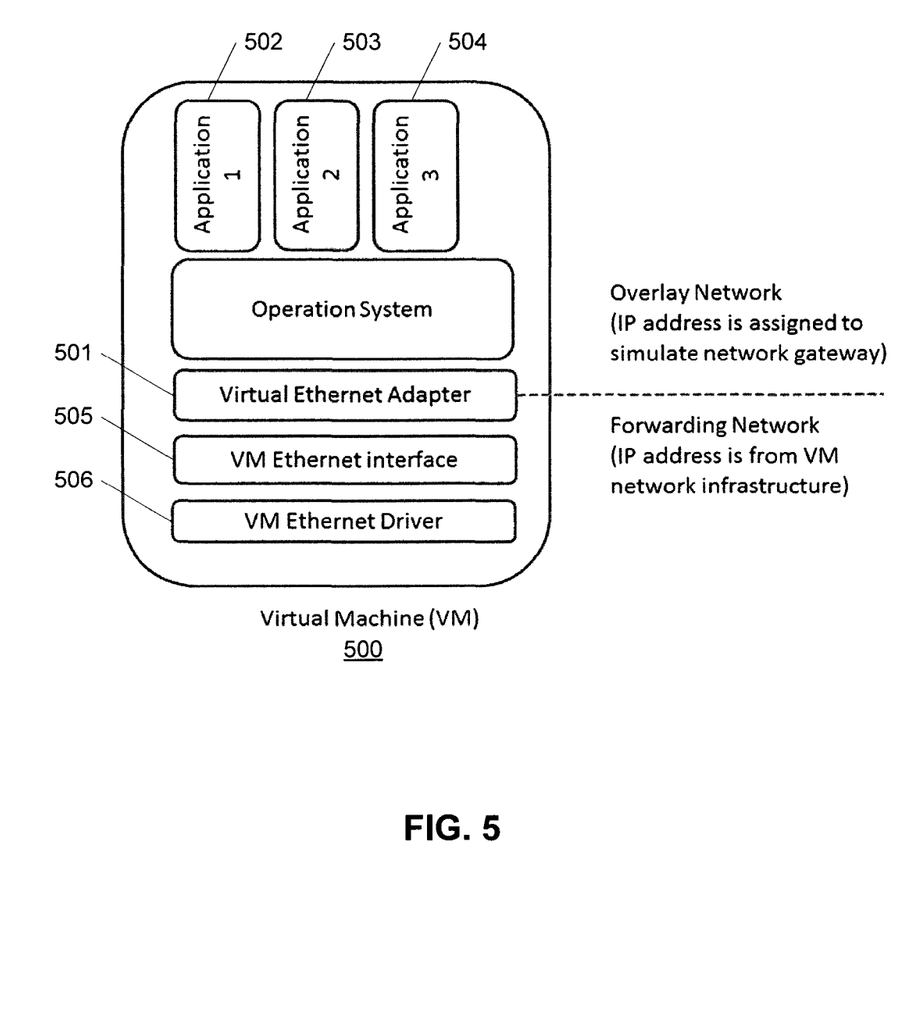
FIG. 5 is a block diagram illustrating an architecture of a processing module according to one embodiment of the invention.

FIG. 5 is a block diagram illustrating virtual machine architecture according to one embodiment of the invention. Referring FIG. 5, virtual machine 500 may be used to host any of service processing modules described above. In one embodiment, virtual machine 500 includes a virtual network adapter 501. There are at least two main functions for virtual network adapter 501. The first function is to intercept the packets coming from the network gateway, de-encapsulate the outer IP header if it uses IP protocol, then forward the packets to the applications 502-504. If there are packets being sent back to the network gateway, the virtual network adapter 501 encapsulates the destination IP address if it uses the IP protocol and then sends it to the underlying network via VM Ethernet interface 505 and VM Ethernet driver 506.

This function ensures that the packets are forwarded between both sides regardless the original IP addresses of the packets.

The second function of virtual network adapter 501 is to separate the IP address of VM Ethernet interface 505 from the IP address "seen" by the applications 502-504 of virtual machine 500. As any IP address can be assigned to virtual network adapter 501, applications 502-504 on virtual machine 500 can use this IP address for application process, regardless the real IP address of VM Ethernet interface 505. The use of the separate IP address will ensure that the user-space application inserts the correct IP address in the packet payload of the application.

In further detail, according to one embodiment, virtual network adapter 501 logically creates an overlay network for virtual machine 500. The applications 502-504 of virtual machine 500 assume the virtual IP address is the interface IP address, while the real IP address of virtual machine Ethernet interface 505 is used to transmit the data between virtual machine 500 and the network gateway. One can create as many as virtual network adapters on virtual machine 500 to simulate the target network environment, and to support a wide variety of the network topologies. The virtual machines can use any operating system, as long as the VM Ethernet driver 506 (also referred to as a virtual network adapter driver) supports the operating system. Thus, the services can be supported on any operating system which may be different from the operating system the network gateway runs.

As a result, the network gateway can employ a significantly large amount of CPU and memory resources for service processing as long as it utilizes more virtual machines to support the service processing. This makes it possible that network gateway can support line rate processing, even with most computation-intensive network services. An embodiment of the invention also allows different operating systems of the virtual machines from the one running on network gateway, which enables users to run network services on any operating systems.

In summary, an embodiment of the invention is to enable running many network services on the gateway without performance degradation. These network services may be running on an overlay network, with the freedom to have their own forwarding scenarios. Embodiments of the invention can tap the cheap resources of public cloud to run virtual machines to support a large amount of traffic without much IT investment, and provide a great scalability and system availability.

Figure 6:
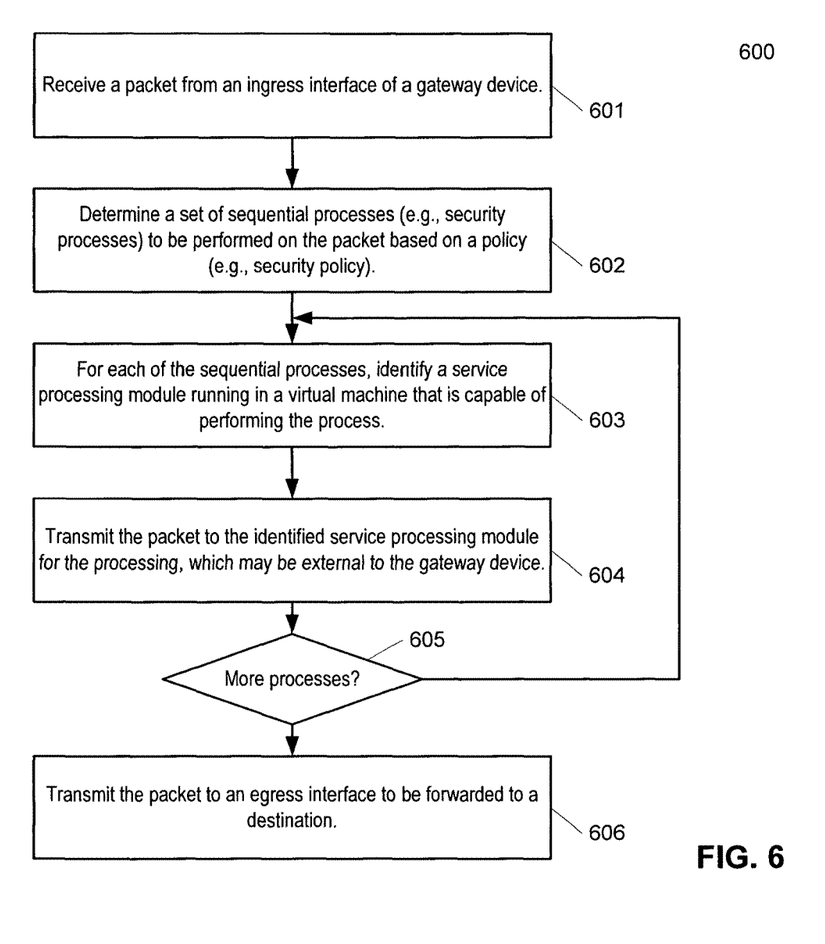
FIG. 6 is a flow diagram illustrating a method for performing distributed services according to one embodiment of the invention.

FIG. 6 is a flow diagram illustrating a method for performing distributed services according to one embodiment of the invention. Method 600 may be performed by processing logic that may include software, hardware, or a combination of both. For example, method 600 may be performed by gateway device 204 of FIG. 2. Referring to FIG. 6, at block 601, a packet is received at an ingress interface of a gateway device coupling a LAN to an external network such as the Internet. At block 602, a set of one or more sequential processes (e.g., security processes) is determined to be performed on the packet based on a policy (e.g., security policy). For each of the identified processes, at block 603, a service processing module running within a virtual machine that is capable of performing the process is identified. For example, an existing service processing module corresponding to the process to be performed having sufficient bandwidth may be invoked. Alternatively, a new virtual machine having a new service processing module may be dynamically allocated and launched. At block 604, the packet is transmitted to the identified service processing module for processing, where the service processing module may be located external to the gateway device and communicatively coupled to the gateway via a variety of communications protocols (e.g., Ethernet or IP protocol). The above operations involved in blocks 603-604 may be iteratively performed for each of the identified processes in the chain, as indicated by decision block 605. Once all of the processes have been performed, at block 606, the packet is then transmitted to an egress interface of the gateway to be forwarded to the destination.

Figure 4:
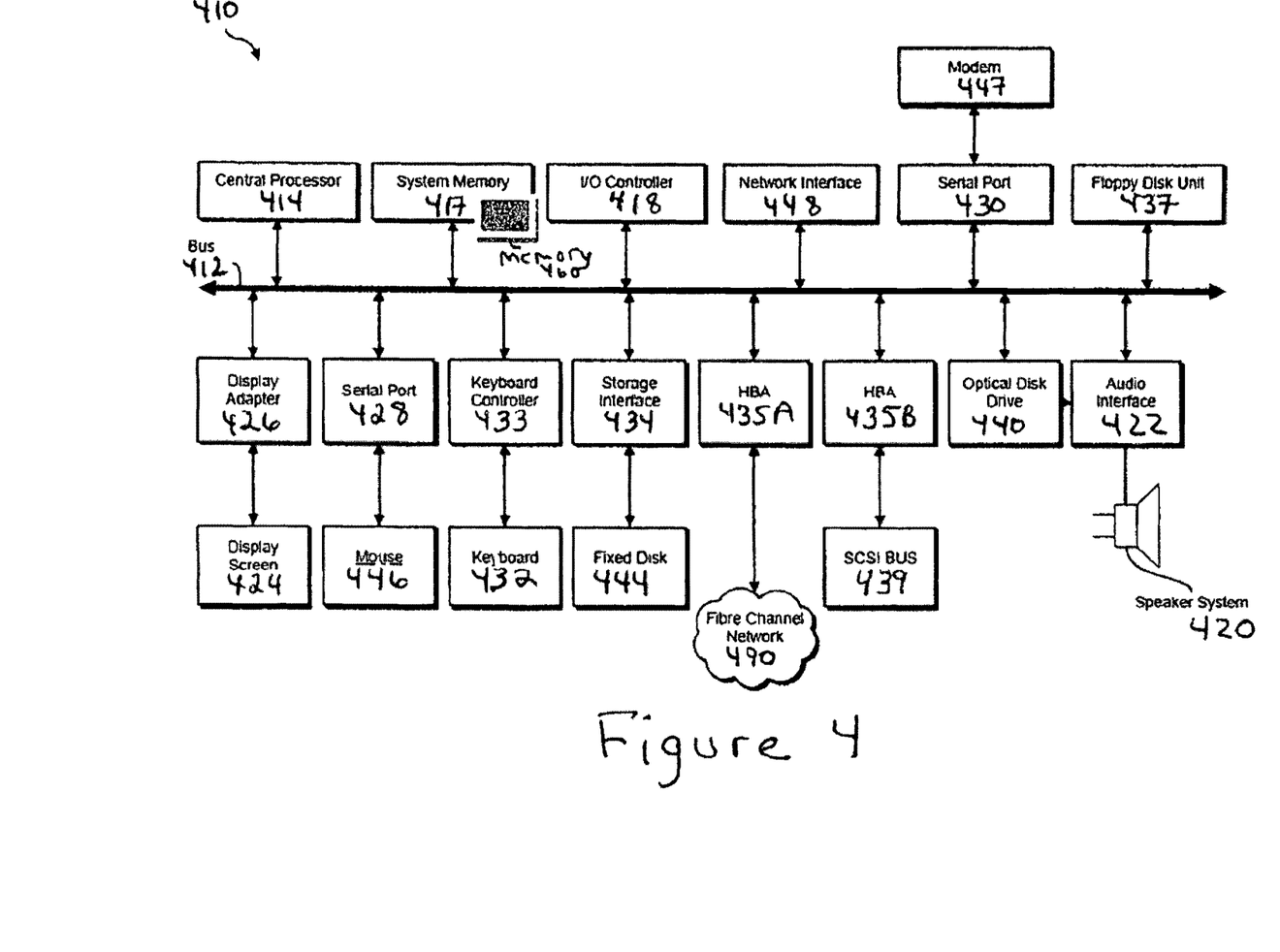
FIG. 4 is a block diagram illustrating an example of a data processing system which may be used as an embodiment of the invention.

FIG. 4 is a block diagram illustrating an example of a data processing system which may be used as an embodiment of the invention. For example, data processing system 410 may be implemented as part of gateway device 204 or alternatively, data processing system 410 may be implemented as part of a client or server device. In one embodiment, data processing system 410, which may operate as a gateway device, includes a memory, an interface to receive one or more packets from the one or more virtual machines, and one or more processors. Referring to FIG. 4, data processing system 410 includes a bus 412 to interconnect subsystems of data processing system 410, such as a central processor 414, a system memory 417 (e.g., Random-Access Memory (RAM), Read-Only Memory (ROM), etc.), an input/output controller 418, an external device, such as a display screen 424 via display adapter 426, serial ports 428 and 430, a keyboard 432 (interfaced with a keyboard controller 433), a storage interface 434, a floppy disk unit 437 operative to receive a floppy disk, a host bus adapter (HBA) interface card 435A operative to connect with a Fibre Channel network 490, a host bus adapter (HBA) interface card 435B operative to connect to a small computer system interface (SCSI) bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with data processing system 410 are generally stored on and accessed via a computer readable medium, such as a hard disk drive (e.g., fixed disk 444), an optical drive (e.g., optical disk drive 440), a floppy disk unit 437, or other storage medium.

Storage interface 434, as with the other storage interfaces of data processing system 410, can connect to a standard computer readable medium for storage and/or retrieval of information, such as a fixed disk 444. Fixed disk 444 may be a part of data processing system 410 or may be separate and accessed through other interface systems.

Modem 447 may provide a direct connection to a remote server via a telephone link or to the Internet via an internet service provider (ISP). Network interface 448 may provide a direct connection to a remote server. Network interface 448 may provide a direct connection to a remote server via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the gateway operations described herein can be stored in computer-readable storage media such as one or more of system memory 417, fixed disk 444, optical disk via optical disk drive 440, or floppy disk via floppy disk unit 437. The operating system provided on computer system 410 may be MS-DOS®, MS-WINDOWS®, OS/2®, UNIX®, Linux®, or another known operating system.

Figure 7:
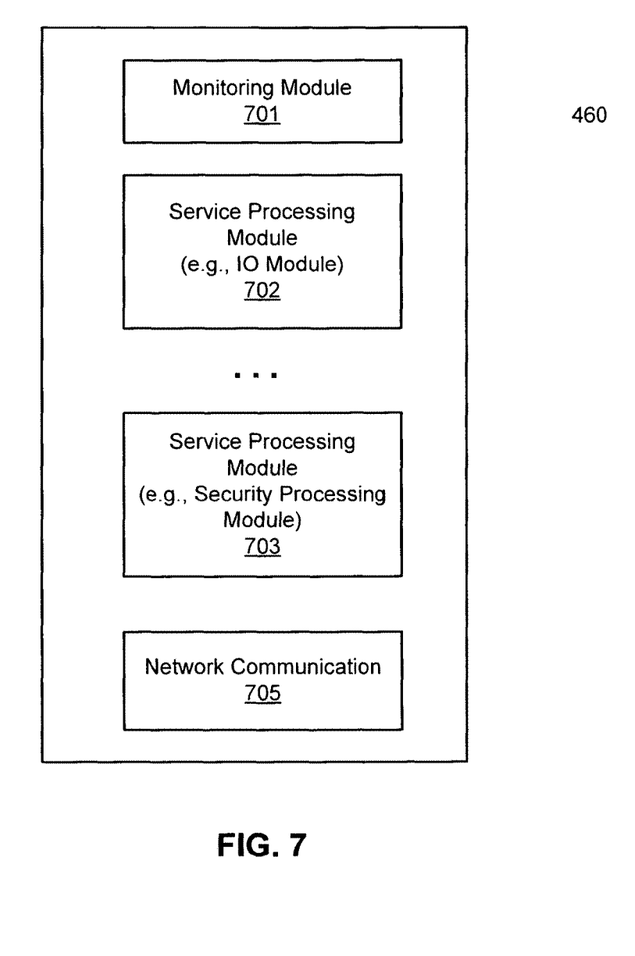
FIG. 7 illustrates a set of code (e.g., programs) and data that is stored in memory of one embodiment of a gateway according to one embodiment.

FIG. 7 illustrates a set of code (e.g., programs) and data that is stored in memory of one embodiment of a gateway, such as a gateway implemented using a system such as depicted in FIG. 4. The gateway uses the code, in conjunction with a processor, to implement the necessary operations (e.g., logic operations) described herein. Referring to FIG. 7, the memory 460 includes a monitoring module 701 which when executed by a processor is responsible for performing traffic monitoring of traffic from the VMs as described above. Monitoring module 701 may be implemented as part of a load balancing module. Memory 460 also stores one or more service processing modules 702-703 which, when executed by a processor, perform any processes on the packets such as security processes. The memory 460 also includes a network communication module 705 used to perform network communication and communication with the other devices (e.g., servers, clients, etc.). For example, any of service processing modules 702-703 may be implemented as any of IO modules and security processing modules of a distributed firewall as described in the above incorporated patent application.

As described above, the servers in FIG. 1 may be implemented using a computer system. In one embodiment, one or more of the servers is implemented using a system such as depicted in FIG. 4 as well, except using different code to implement the techniques and operations performed by such servers and their VMs as described above. The code is stored in computer-readable storage medium such as system memory 417, fixed disk 444, optical disk via optical disk drive 440, or floppy disk via floppy disk unit 437.

Figure 8:
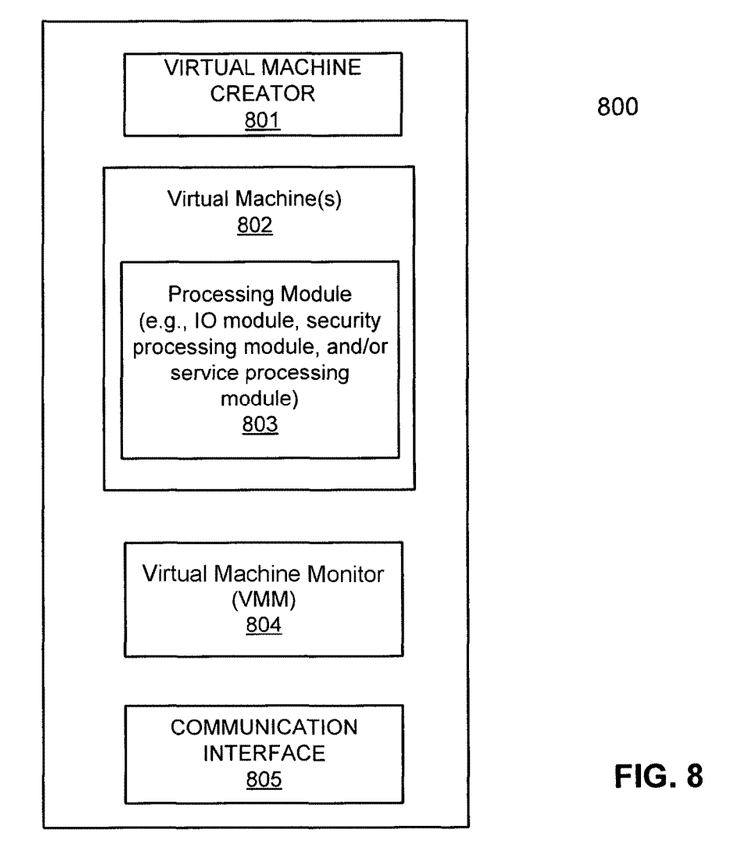
FIG. 8 illustrates a set of code (e.g., programs) and data that is stored in memory according to one embodiment.

FIG. 8 illustrates a set of code (e.g., programs) and data that is stored in one of those memories. In one embodiment of the server, such as implemented using the system shown in FIG. 4. The server uses the code, in conjunction with the processor, to implement the necessary operations to implement the process depicted above, such as, for example, the operation set forth in FIG. 6. Referring to FIG. 8, the memory 800 includes virtual machine creator 801 which when executed by a processor is responsible for creating a virtual machine on the server in a manner well-known in the art. Memory 800 also includes one or more virtual machines 802 which may be created by virtual machine creator 801. Virtual machine 802 includes a processing module 803 executed therein, which can be one or more of an IO module, a security processing module, and/or a service processing module (e.g., NAT, VPN, DPI, anti-virus processes). Memory 800 further includes virtual machine monitor (VMM) 804 responsible for managing virtual machines 802. Memory 800 also includes communication interface module 805 used for performing communication with other devices (e.g., security gateway, servers, clients, etc.).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g., circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a packet at an ingress interface of a gateway device communicatively coupled to a local area network (LAN) and an external network;
   determining a first service and a second service corresponding to a connections session, the first service and the second service determined using a policy;
   identifying a first service processing module associated with the first service, the first service processing module being executed by a first virtual machine having a first guest operating system, the first virtual machine running on a first physical host being communicatively coupled to the gateway device, the first physical host having a first host operating system, the first host operating system providing a first hypervisor;

sending the packet to the first service processing module, the first service processing module performing the first service on the packet to produce a first processed packet;

determining whether the first service processing module has sufficient bandwidth to handle the first service;

when the first service processing module does not have sufficient bandwidth to perform the first service on the packet:
  allocating and launching a third service processing module; and
  alternatively sending the packet to the third service processing module, the third service processing module performing the first service on the packet to produce the first processed packet;

identifying a second service processing module associated with the second service, the second service processing module being executed by a second virtual machine having a second guest operating system, the second virtual machine running on a second physical host being communicatively coupled to the gateway device, the second physical host having a second host operating system, the second host operating system providing a second hypervisor;

sending the first processed packet to the second service processing module, the second service processing module performing the second service on the first processed packet to produce a second processed packet; and forwarding the second processed packet at an egress interface of the gateway device to a destination.

2. The method of claim 1, wherein a public cloud communicatively coupled to the external network comprises at least one of the first physical host and the second physical host.

3. The method of claim 1, wherein the first service and the second service include at least one of a network address translation (NAT) process, a virtual private network (VPN) process, a deep packet inspection (DPI) process, and an anti-virus process.

4. A non-transitory computer-readable storage medium having embodied thereon a program, the program being executable by a processor to perform a method, the method comprising:
  receiving a packet at an ingress interface of a gateway device communicatively coupled to a local area network (LAN) and an external network;
  determining a first service and a second service corresponding to a connections session, the first service and the second service determined using a policy;
  identifying a first service processing module associated with the first service, the first service processing module being executed by a first virtual machine using a first guest operating system, the first virtual machine running on a first physical host using a first host operating system, the first host operating system providing a first hypervisor, the first physical host being communicatively coupled to the gateway device;
  sending the packet to the first service processing module, the first service processing module performing the first service on the packet to produce a first processed packet;
  determining whether the first service processing module has sufficient bandwidth to handle the first service;

when the first service processing module does not have sufficient bandwidth to perform the first service on the packet:
    allocating and launching a third service processing module; and
    alternatively sending the packet to the third service processing module, the third service processing module performing the first service on the packet to produce the first processed packet;
  identifying a second service processing module associated with the second service, the second service processing module being executed by a second virtual machine using a second guest operating system, the second virtual machine running on a second physical host using a second host operating system, the second host operating system providing a second hypervisor, the second physical host being communicatively coupled to the gateway device;
  sending the first processed packet to the second service processing module, the second service processing module performing the second service on the first processed packet to produce a second processed packet; and
  forwarding the second processed packet at an egress interface of the gateway device to a destination.

5. The non-transitory computer-readable storage medium of claim 4, wherein a public cloud communicatively coupled to the external network comprises at least one of the first physical host and the second physical host.

6. The non-transitory computer-readable storage medium of claim 4, wherein the first service and the second service include at least one of a network address translation (NAT) service, a virtual private network (VPN) service, a deep packet inspection (DPI) service, and an anti-virus service.

7. A gateway device, comprising:
  an ingress interface;
  an egress interface; and
  a load balancing module coupled to the ingress and egress interfaces, the load balancing module comprising:
    at least one processor; and
    a memory coupled to the at least one processor, the memory storing instructions executable by the at least one processor to perform a method comprising:
      receiving a packet from the ingress interface;
      determining a first service and a second service corresponding to a connections session associated with the packet, the first service and the second service determined using a policy;
      identifying a first service processing module associated with the first service, the first service processing module being executed by a first virtual machine having a first guest operating system, the first virtual machine running on a first physical host being communicatively coupled to the gateway device, the first physical host having a first host operating system, the first host operating system providing a first hypervisor;
      sending the packet to the first service processing module, the first service processing module performing the first service on the packet to produce a first processed packet;
      determining whether the first service processing module has sufficient bandwidth to handle the first service;
      when the first service processing module does not have sufficient bandwidth to perform the first service on the packet:

allocating and launching a third service processing module; and alternatively sending the packet to the third service processing module, the third service processing module performing the first service on the packet to produce the first processed packet;

identifying a second service processing module associated with the second service, the second service processing module being executed by a second virtual machine having a second guest operating system, the second virtual machine running on a second physical host being communicatively coupled to the gateway device, the second physical host having a second host operating system, the second host operating system providing a second hypervisor;

sending the first processed packet to the second service processing module, the second service processing module performing the second service on the first processed packet to produce a second processed packet; and forwarding the second processed packet at an egress interface of the gateway device to a destination.

8. The gateway device of claim 7, wherein a public cloud associated with an external network comprises at least one of the first physical host and the second physical host.

9. The gateway device of claim 7, wherein the first service and the second service include at least one of a network address translation (NAT) service, a virtual private network (VPN) service, a deep packet inspection (DPI) service, and an anti-virus service.

10. The method of claim 1, further comprising:
determining whether the second service processing module has sufficient bandwidth to handle the second service.

11. The method of claim 10, further comprising:
when the second service processing module does not have sufficient bandwidth to perform the second service on the packet:
  allocating and launching a fourth service processing module; and
  alternatively sending the first processed packet to the fourth service processing module, the fourth service processing module performing the second service on the first processed packet to produce the second processed packet.

12. The non-transitory computer-readable storage medium of claim 4, wherein the method further comprises:
determining whether the second service processing module has sufficient bandwidth to handle the second service.

13. The non-transitory computer-readable storage medium of claim 12, wherein the method further comprises:
when the second service processing module does not have sufficient bandwidth to perform the second service on the packet:
  allocating and launching a fourth service processing module; and
  alternatively sending the first processed packet to the fourth service processing module, the fourth service processing module performing the second service on the first processed packet to produce the second processed packet.

14. The gateway device of claim 7, wherein the method further comprises:
determining whether the second service processing module has sufficient bandwidth to handle the second service.

15. The gateway device of claim 14, wherein the method further comprises:
when the second service processing module does not have sufficient bandwidth to perform the second service on the packet:
  allocating and launching a fourth service processing module; and
  alternatively sending the first processed packet to the fourth service processing module, the fourth service processing module performing the second service on the first processed packet to produce the second processed packet.

* * * * *